US012754378B2

(12) United States Patent
Vincent

(10) Patent No.: US 12,754,378 B2
(45) Date of Patent: Oct. 6, 2026

(54) ELECTRICAL AND/OR OPTICAL CONTACT COMPRISING A BODY AND A CABLE SLEEVE CONFIGURED TO PREVENT UNWANTED UNLOCKING OF A CONNECTION, CONNECTOR OR ADAPTOR HOUSING SUCH A CONTACT

(71) Applicant: RADIALL, Aubervilliers (FR)

(72) Inventor: Romain Vincent, Neuville sur Brenne (FR)

(73) Assignee: RADIALL, Aubervilliers (FR)

( * ) Notice: Subject to any disclaimer, the term of this patent is extended or adjusted under 35 U.S.C. 154(b) by 266 days.

(21) Appl. No.: 18/376,540

(22) Filed: Oct. 4, 2023

(65) Prior Publication Data

US 2024/0151913 A1 May 9, 2024

(51) Int. Cl.
*G02B 6/38* (2006.01)
*H01R 13/627* (2006.01)
*H01R 13/629* (2006.01)

(52) U.S. Cl.
CPC ......... *G02B 6/3831* (2013.01); *G02B 6/3893* (2013.01); *H01R 13/6275* (2013.01); *H01R 13/629* (2013.01)

(58) Field of Classification Search
None
See application file for complete search history.

(56) References Cited

U.S. PATENT DOCUMENTS 10,305,222 B2 5/2019 Haller
11,002,923 B2 5/2021 Ho
2010/0310213 A1* 12/2010 Lewallen ............ G02B 6/3817 385/75
2018/0011268 A1 1/2018 Dupeux
2021/0072465 A1 3/2021 Philippe

FOREIGN PATENT DOCUMENTS

EP 0596766 5/1994

OTHER PUBLICATIONS

French Search Report dated May 10, 2023.

* cited by examiner

*Primary Examiner* — Jerry Rahll
(74) *Attorney, Agent, or Firm* — IPSILON USA, LLP

(57) ABSTRACT

An electrical and/or optical contact includes a body and a cable sleeve that prevents unwanted unlocking of a connection, connector, or adaptor housing such a contact. An electrical and/or optical contact (1, 4) incorporates a means for temporarily retaining the cable sleeve to which a pushing/pulling force is applied in order to intentionally lock/unlock the one or more contacts of the connector in its or their receiving cavity. This retaining means is dimensioned so as to generate a force that balances the pulling force exerted on the sleeve, as long as said pulling force remains below a predetermined threshold.

15 Claims, 6 Drawing Sheets

ELECTRICAL AND/OR OPTICAL CONTACT COMPRISING A BODY AND A CABLE SLEEVE CONFIGURED TO PREVENT UNWANTED UNLOCKING OF A CONNECTION, CONNECTOR OR ADAPTOR HOUSING SUCH A CONTACT

RELATED APPLICATION

This application claims the benefit of priority from French Patent Application No. 22 10210, filed on Oct. 5, 2022, the entirety of which is incorporated by reference.

FIELD OF THE INVENTION

The present invention relates to the field of electrical and/or optical contacts.

It more particularly relates to solutions for locking/unlocking a contact within a receiving cavity in a connector insert, a connector or an adaptor.

The invention primarily aims to make the locking between an electrical/optical contact and its receiving cavity in a connector insert or a connector or an adaptor installed on an item of equipment reliable by reducing the risk of unlocking and thus of unwanted disconnection.

Although it is described with reference to an optical contact, the invention may be implemented with an electrical contact and generally with all types of optical or electrical contacts.

Although it is described with reference to an application in the aeronautical field, the invention may be applied in other fields such as the railway field, the industrial field, the medical field, or even telecommunications, in particular in harsh environments. In particular, the invention may be applied to connectors in the aeronautical field complying with the standards ARINC 600, ARINC 404, MTh 38999, EN2997, EN4644, EN4165, and also to direct optical adaptors or else to connectors in the railway field complying with the standard EN50467.

The invention may be implemented in any type of connector technology in which at least one optical or electrical contact is inserted, for example multi-contact connectors or connectors forming adaptors/fittings assigned to an item of equipment, harness or the like.

PRIOR ART

In the field of connector technology for transmitting electrical signals and/or data and/or radiofrequency (RF) signals, it is known that electrical, fibre-optic and other connections are made using two connectors that slot into one another, generally in the form of male and female connectors that are coupled to one another. This may also involve a connector in the form of an adaptor or a fitting.

Each male or female connector contains electrical contacts, optical contacts or other contacts that are mutually situated and configured so as to provide a connection between one another when the male and female connectors are coupled to one another.

One general specification in the field of connectors is to ensure that, when a connector is equipped with its one or more contacts, or when two complementary connectors are coupled and locked, their contacts are not able to be inadvertently unlocked during installation or in use, so as to guarantee the electrical and/or optical connection.

Such inadvertent decoupling/disconnection during installation or in use may lead to malfunctions due to the interruption of the one or more signals to be transmitted between the connectors.

Unwanted disconnection may be the result of one and/or more of the following causes:

- the operator accidentally pulling on the cable connected to one or more contacts of a connector in the connected and locked configuration;
- the operator accidentally pulling on the mechanism for unlocking one or more contacts of a connector in the connected and locked configuration;
- harsh operating conditions, such as impacts and/or vibrations and/or accelerations;
- a significant pressure differential between an inside environment delimited by the connector itself and the outside, which may be expressed as a “champagne cork” effect. For example, a differential of this kind may be found in the case of reduced pressure due to altitude.

FIGS. 1 and 2 illustrate a connection and locking assembly between a male connector CM and a complementary female connector CF with optical contacts 1 and 2, in their connected configuration, which defines an optical coupling region Z.

Each of these two contacts 1, 2 extends along a longitudinal axis X1, X2, said axes being coincident when the contacts are in their connected configuration.

Firstly, each of these two contacts 1, 2 comprises, at the front, a central body 10, 20 for housing and holding at least one optical ferrule intended to be connected to one end of a cable C1, C2.

A peripheral locking/unlocking body 11, 21, which is usually referred to as a sheath, is mounted so as to be able to slide around the central body 10, 20. A sheath 11 or 21 can be mounted on the central body 10 or 20 by way of a press-fit or clip-fastening/snap-fastening. Each sheath 11, 21 is mounted so as to be able to slide inside a sleeve 12, 22, which is designed to house the cable C1, C2 and to move rearwards or forwards with respect to the central body 10, 20. This assembly may be achieved by snap-fastening complementary shapes of a portion of these component parts.

Furthermore, each of the connectors CM, CF comprises at least one cavity 130, 230 or an insert 13, 23 with at least one cavity 130, 230 in which the central body 10, 20 is inserted and held, preferably by clip-fastening. Each of the inserts 13, 23 is mounted in a housing 14, 24. Alternatively, an insert 13, 23 may also be an integral part of a housing 14, 24. As illustrated, each central body 10, 20 may comprise, on at least one of its side edges, one or more clip-fastening lugs 100, 200 in order to clip-fasten the body 10, 20 within the corresponding cavity 130, 230. This clip-fastening establishes the proper mechanical installation of the contact 1, 2 in the connectors CM, CF, which enables, once the connectors have been coupled, an optical connection and the proper transmission of optical signals.

At least one elastic return means, for example a return spring R, is mounted between the central body 10, 20 and the sheath 11, 21 mounted around the latter. This return spring makes it possible to bring the sheath 11, 21 from an unlocking position in which the one or more clip-fastening lugs 100, 200 are able to be unclipped from the or their cavity 130, 230 to a locking position in which the sheath 11, 21 prevents the one or more clip-fastening lugs 100, 200 from being unclipped from the or their cavity 130, 230.

A contact 1, 2 is connected and locked within an insert 13, 23 in the following manner.

The optical and/or electrical contact 1, 2 is inserted into the dedicated cavity 130, 230: to achieve this, the sleeve 12, 22 pushes against the rear central body 18, then, under the action of a clip 131, 231 inside the insert 13, 23, the sheath 11, 21 retracts relative to the central body 10, 20, thereby providing access to the clip-fastening lugs 100, 200 and, as a result, allowing the clip 131, 231 to be clip-fastened onto the body 10, 20 within the dedicated cavity 130, 230. Then, under the effect of the return spring, the sheath 11, 21 moves forwards and covers the complementary shapes 131, 231 for clip-fastening to the lugs 100, 200 of the cavity 130, 230, thereby preventing the contact from being unlocked.

Intentional unlocking and disconnection are carried out in the following manner.

Exerting a rearwards pulling force on the sleeve 12, 22 causes the sheath 11, 21, which is secured to the sleeve, to retract, thereby uncovering the complementary reliefs 131, 231 of the cavity 130, 230 and thus allowing the contact to be unclipped from the latter.

This configuration is generally satisfactory. However, there are risks of unwanted unlocking and therefore of unwanted disconnection.

Specifically, the sleeve 12, 22 can be mistakenly pulled rearwards by an operator or undesirably engaged with whilst the cable is being handled or the like, which causes the sheath 11, 21 to be moved rearwards and thus results in unlocking due to the lugs 100, 200 being unclipped, and thus ultimately in the optical and/or electrical contact being disconnected and the associated signal being lost.

There is therefore a need to prevent the unwanted unlocking of an optical, electrical or data contact within a cavity of a connector using a sleeve for intentional locking/unlocking.

The invention aims to meet this need in full or in part.

OBJECTS AND SUMMARY

To this end, the invention relates, according to one of its aspects, to an electrical and/or optical contact, comprising:

- at least one central body extending along a longitudinal axis (X), comprising:
  - a front portion designed to house and hold at least one electrically conductive element and/or an optical ferrule intended to be connected to one end of a cable; the front portion comprising at least one means for locking/unlocking the connection between the contact and the cavity into which it is intended to be inserted;
  - a rear portion designed to house the end of the cable;
- a sleeve designed to house the cable and to move rearwards/forwards with respect to the central body, the sleeve comprising at least one means for temporarily retaining the sleeve on the central body or on a component of the connector that is fixed with respect to the body, the temporary-retention means being active in the event of a pulling force (F1) below or equal to a predetermined threshold (F2) being exerted on the sleeve, in order to prevent the unlocking means, which disconnects the contact, from being activated.

Preferably, the pulling force (F3) to be exerted on the sleeve in order to activate the unlocking means is greater than the predetermined threshold.

According to one advantageous embodiment, the temporary-retention means is arranged such that, when the latter is inactive, the sleeve moves rearwards along a non-zero travel in order to activate the unlocking means.

According to a first advantageous configuration, the contact comprises, as locking/unlocking means:

- a peripheral body, referred to as a sheath, which is mounted so as to be able to slide around the central body,
- one or more clip-fastening lugs on at least one of the side edges of the central body in order to clip-fasten the latter within the cavity,
- the temporary-retention means being a flexible arm that is fixed to or produced integrally with the sleeve, the flexible arm being designed, in the event of a pulling force (F1) below or equal to the predetermined threshold (F2) being exerted on the sleeve, to come into and be retained in abutment against a shoulder of the central body, and, above this predetermined threshold, to be deflected and released from the abutment, the sleeve being mounted so as to be able to slide rearwards with respect to the central body and to the sheath along a travel beyond the abutment until it engages with one or more reliefs of the sheath and, in the event of a pulling force (F3), moves the sheath rearwards into an unlocking position in which it releases the one or more lugs and allows the latter to be unclipped.

According to one advantageous variant embodiment, the contact comprises two central bodies, one of which forms the front portion within which the optical ferrule is housed and the other of which forms the rear portion that is mounted within the sleeve.

According to another advantageous variant embodiment, the contact comprises at least one return spring mounted between the central body and the sheath and designed to bring the sheath from its unlocking position to its locking position in which it prevents the one or more clip-fastening lugs from being unclipped from the or their cavity.

According to this first configuration, the contact comprises an optical ferrule of MT ferrule type, which contains a plurality of optical channels that are designed to individually house an optical fibre, the optical ferrule being housed within the central body. The optical ferrule may allow a connection on the basis of an optical cable in the form of a ribbon with at least 8 optical fibres, in order to provide an optical multi-fibre connection, such as the connection usually encountered in MPO or MTP connectors.

According to one advantageous configuration, the contact comprises, as locking/unlocking means, at least one lever mounted so as to be able to pivot on the central body, the temporary-retention means being a lug that is fixed to or produced integrally with the sleeve, the lug being designed, in the event of a pulling force (F1) below or equal to the predetermined threshold (F2) being exerted on the sleeve, to come into and be retained in abutment against a recess in the central body, and, above this predetermined threshold, to be disengaged from the abutment, the sleeve comprising at least one through-aperture within which the lever is housed, the sleeve being mounted so as to be able to slide rearwards with respect to the central body along a travel beyond the abutment until the edge of the aperture causes the lever to pivot, in the event of a pulling force (F3), into an unlocking position in which it unlocks the contact.

According to this configuration, the contact of LC type comprises an optical ferrule, which contains a central optical channel that is designed to house a single optical fibre, the optical ferrule being housed within the central body.

The sleeve is preferably based on polymer material.

The contact according to the invention may advantageously comprise a gasket arranged at the periphery of the sleeve in order to seal the one or more cavities in which the one or more contacts are intended to be inserted. The gasket may be mounted around the periphery of the sleeve or else overmoulded with the latter.

The invention also relates to a connector comprising at least one cavity into which the one or more contacts as described above are intended to be inserted.

The invention also relates to an adaptor comprising a body defining the one or more cavities into which the one or more contacts as described above are intended to be inserted.

The invention also relates to the use of a connector or adaptor as described above for producing an electrical and/or optical connection in the aeronautical field, the predetermined threshold being at least equal to 8 N.

The invention thus essentially consists of a contact that incorporates a means for temporarily retaining the cable sleeve to which a pushing/pulling force is applied in order to intentionally lock/unlock the one or more contacts of the connector in its or their receiving cavity, this retaining means being dimensioned so as to generate a force that balances the pulling force exerted on the sleeve, as long as said pulling force remains below a predetermined threshold.

This prevents any unwanted unlocking, that is to say unintentional unlocking, from occurring in the event of an insufficient pulling action. This predetermined threshold may be adjusted by design, in particular according to the required application criteria.

The invention has many advantages, which include:

- the elimination of the risk of unwanted unlocking of a contact from its receiving cavity in an electrical and/or optical connector and thereby the loss of signal transmission;
- the simplicity of the design of the temporary-retention means, which does not increase the bulk of the contact and/or of the connector and thus allows a high integration density to be maintained;
- the possibility of easily adjusting the predetermined threshold above which the temporary retention is no longer effective, and in particular of increasing said threshold for applications, particularly aeronautical applications, in which a sealed connector may be subjected to severe reduced pressures;
- the possibility of easily adjusting the predetermined threshold above which the temporary retention is no longer effective without having an impact on the insertion force;
- the compatibility of connection with contacts from the prior art.

Other advantages and features of the invention will become more clearly apparent upon reading the detailed description of exemplary implementations of the invention, given by way of non-limiting illustration, and with reference to the following figures.

DETAILED DESCRIPTION

Figure 1:
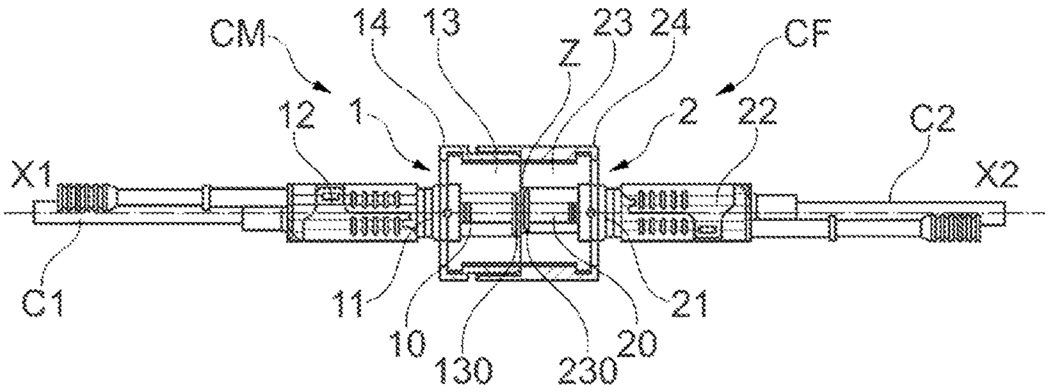
Fig. 1 (PRIOR ART)
FIG. 1 shows a partial longitudinal cross-sectional view of an optical connection assembly, of MPO (multiple-fibre push-on/pull-off) contact type, according to the prior art in the connected and locked configuration.

Throughout the present application, the terms “internal” and “external” should be understood with respect to an electrical and/or optical contact according to the invention or an accessory of an electrical and/or optical contact according to the invention.

For the sake of clarity, the same reference numeral is used for the same element of an electrical connection assembly according to the prior art and of an electrical connection assembly according to the invention.

Figure 2:
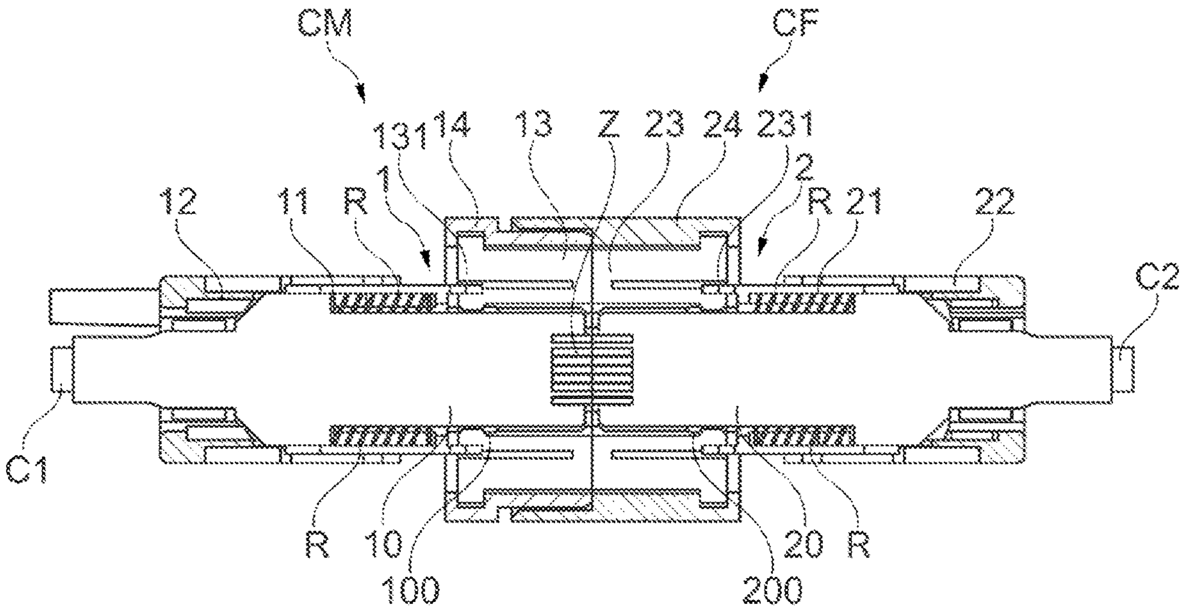
Fig. 2 (PRIOR ART)
FIG. 2 is another partial longitudinal cross-sectional view of a connection assembly according to FIG. 1.

FIGS. 1 and 2 have already been described in detail in the preamble. They will therefore not be discussed below.

Figure 3:
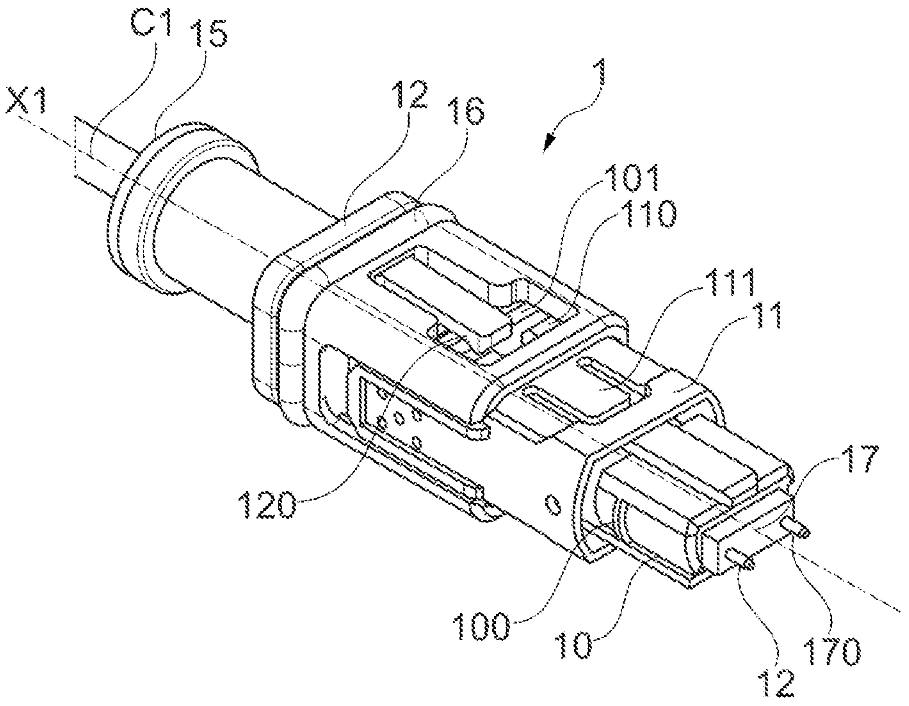
FIG. 3 is a perspective view of an optical contact of MPO type according to the invention.
Figure 4:
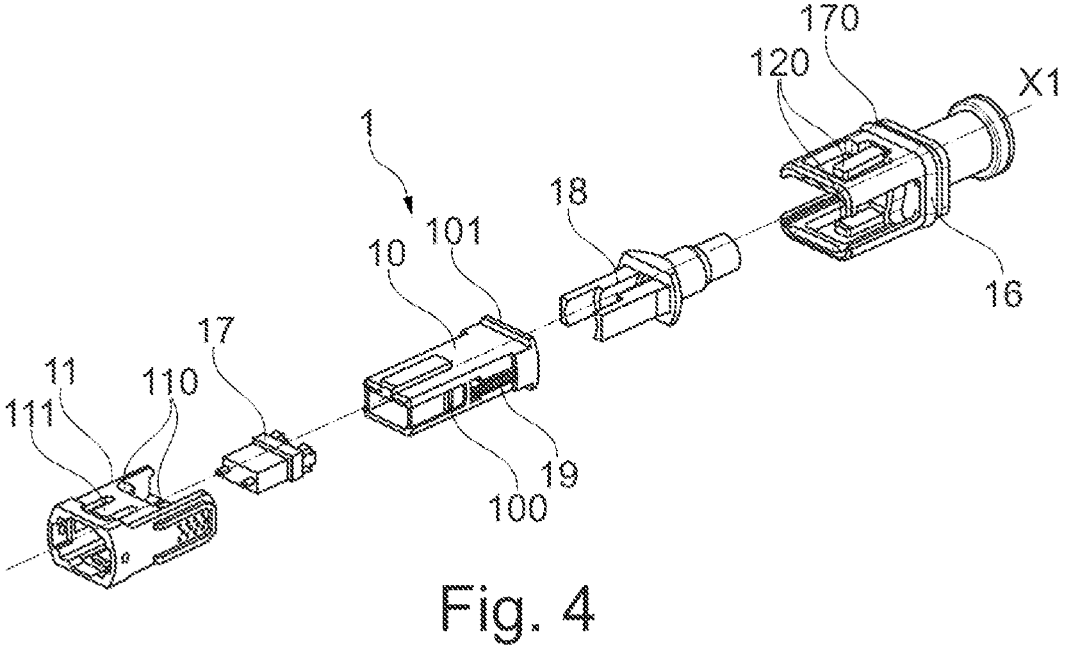
FIG. 4 is an exploded view of a contact according to FIG. 3.
Figure 5:
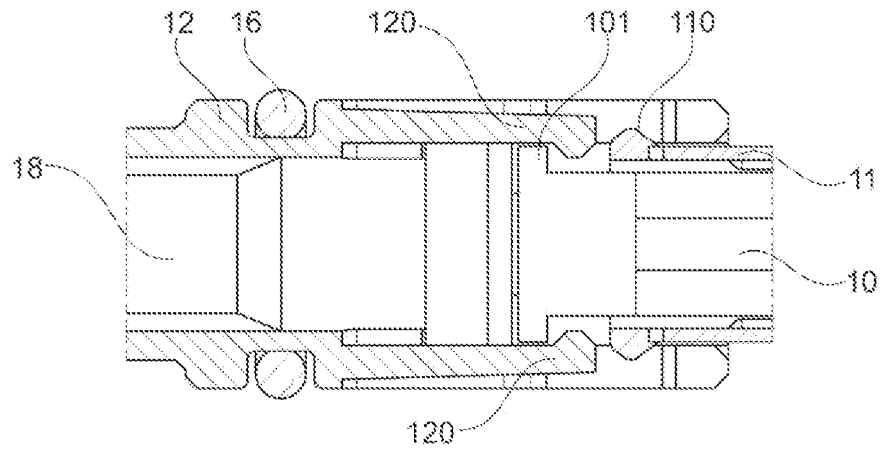
FIG. 5 is a partial longitudinal cross-sectional view of a contact according to FIG. 3 or 4.
Figure 6:
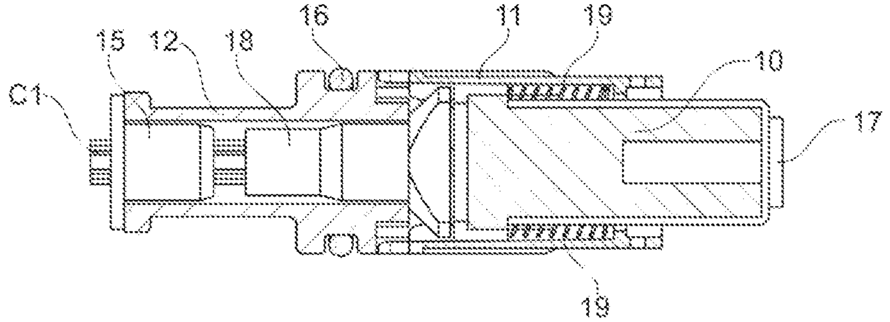
FIG. 6 is a partial longitudinal cross-sectional view of a contact according to one of FIGS. 3 to 5 in its configuration in which it is installed in a connector insert or in an adaptor.

FIGS. 3 to 5 show a first embodiment of an optical contact of sealed MPO type according to the invention.

This contact 1 extends along a longitudinal axis X1 and comprises, first of all, at the front, a front central body 10.

It also comprises a gasket 15, which is mounted at the rear of the sleeve 12 and creates a seal between a cable C1 and the rear end of the sleeve 12 mounted around the latter. An additional gasket 16, for example an O-ring, is mounted at the periphery and at the rear of the sleeve 12 and creates a seal between the contact 1 and the cavity 130. These gaskets 15 and 16 therefore create a sealing region inside the cavity 130 in which the central body 10 is mounted.

This sealing region is therefore delimited inside the cavity 130 around the optical and/or electrical contact 1 in its connected configuration at the coupling region Z.

The contact 1 also comprises an optical ferrule 17, which comprises one or more optical channels, typically 8, 12 or 24, and is housed and held within the front central body 10. This ferrule 17 is intended to be connected to one end of an optical cable C1.

The contact 1 comprises, at the rear, a rear central body 18 that slots into the front body 10 and through which a portion of the cable C1 is intended to pass. The rear central body 18 may itself be composed of one or more component parts.

The front central body 10 comprises, on its side edges, one or more clip-fastening lugs 100, which allow the central body 10 to be clip-fastened within its receiving cavity and ensure the connection of the optical channels inside the ferrule 17 in the connected configuration of the connector 1.

A sheath 11 is mounted so as to be able to slide around the front central body 10. For example, the sheath 11 can be mounted on the front central body 10 by way of a press-fit or clip-fastening/snap-fastening, in particular by way of at least one tab 111.

The sheath 11 is also mounted so as to be able to slide inside a sleeve 12, which is designed to house the cable C1 and to move forwards/rearwards with respect to the front central body 10. This assembly may be achieved by snap-fastening complementary shapes of a portion of these component parts. For example, clip-fastening protuberances 110 may be arranged at the rear of the sheath 11: they are clip-fastened within the sleeve 12 as detailed below.

At least one return spring 19, preferably in the form of a helical spring, is mounted between the central body 10 and the sheath 11 mounted around the latter. This return spring 19 makes it possible to bring the sheath 11 from an unlocking position in which the one or more clip-fastening lugs 100 are able to be unclipped from its or their receiving cavity to a locking position in which the sheath 11, 21 prevents the one or more clip-fastening lugs 100 from being unclipped from the or their cavity 130, 230.

Figure 7:
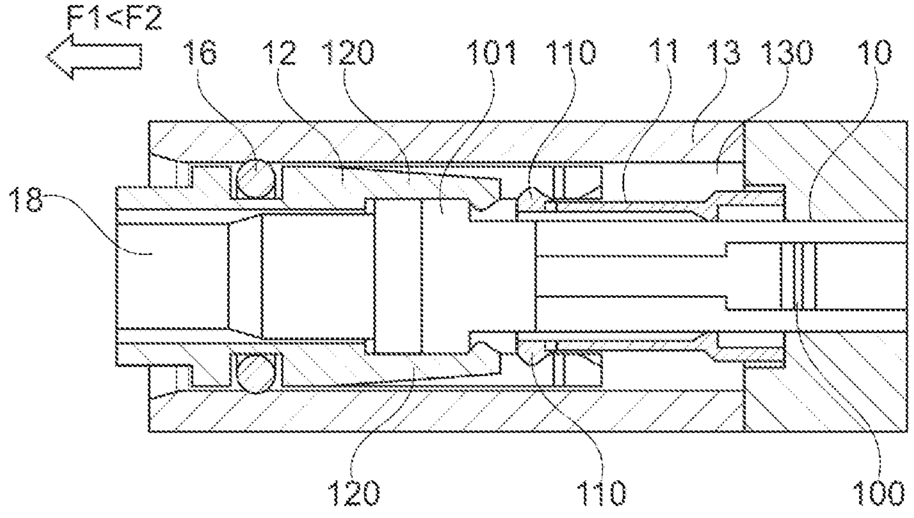
FIG. 7 is a partial longitudinal cross-sectional view of a contact according to one of FIGS. 3 to 5 illustrating the flexible arms as temporary-retention means in accordance with the invention, in their retaining position, and showing the insert and its cavity into which the optical contacts are inserted.

According to the invention, the sleeve 12 comprises at least one flexible arm 120, which has the function, in the event of a rearwards pulling action, of temporarily retaining the sleeve 12 in an intermediate position, referred to as the retaining position, in which the contact is prevented from being unlocked. More specifically, as is illustrated in FIG. 7, the flexible arm 120 comprises a protuberance that temporarily comes into abutment against a shoulder 101 at the rear of the front central body 10. The temporary-retention force can be adjusted by dimensioning the flexible arm 120 as desired. This force is typically greater than or equal to 8 N for a contact of MPO type.

Alternatively, the flexible arm 120 may comprise a notch, which receives a rib protruding from the front central body 10 and allows the retaining function to be achieved.

Figure 8:
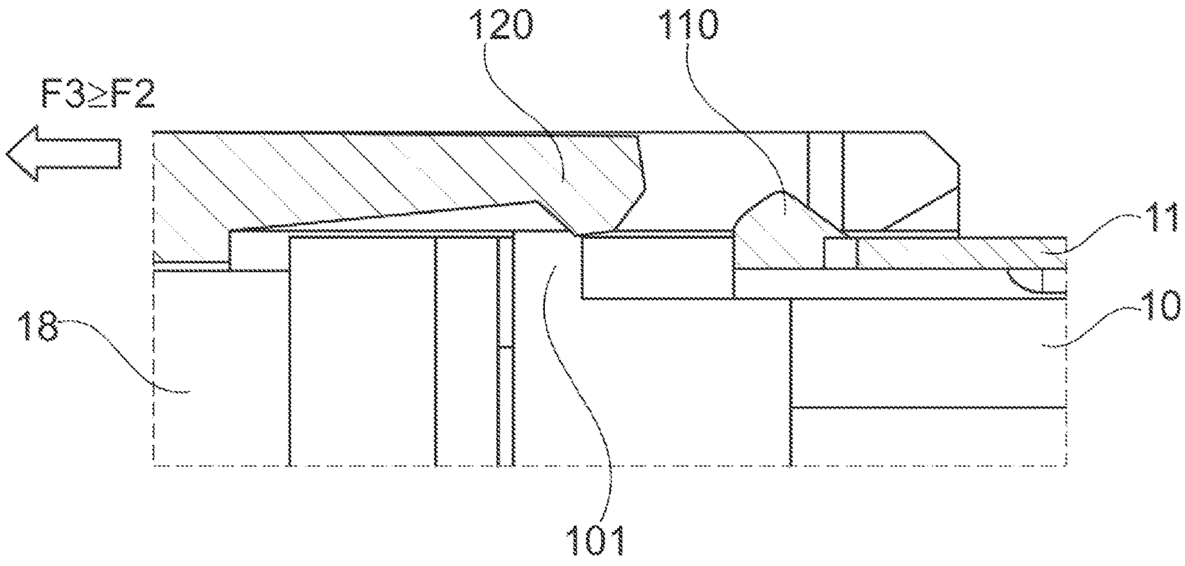
FIG. 8 shows one portion of FIG. 7 again, illustrating one of the flexible arms in its released position, which allows for intentional unlocking.

Exerting an additional pulling action on the sleeve 12, with a force greater than the retention force, causes the arm 120 to be deflected so as to no longer be in abutment against the shoulder 101, as is illustrated in FIG. 8. The front face of the sleeve 12 may then exert a retraction force on the sheath 11 via the protuberances 110, and the sheath 11 may thus retract rearwards, thereby unlocking the central body 10 and the optical ferrule 17 and therefore disconnecting the optical contact 1, 2 from its receiving cavity.

A contact cabled to an optical cable C1 is connected and locked within an insert in the following manner.

The optical contact 1, which comprises the optical ferrule 17 defining the optical channels, is inserted into the dedicated insert cavity: the sleeve 12 pushes against the rear central body 18 and the front central body 10, the sheath 11 then retracts relative to the front central body 10, 20, thereby providing access to the clip-fastening lugs 100 and, as a result, allowing the front body 10 to be clip-fastened to the complementary reliefs 131, 231 of the corresponding insert (FIG. 2). Then, under the effect of the return spring 19, the sheath 11 moves forwards and covers the complementary reliefs 131, 231 in the insert, thereby preventing the contact from being unlocked.

Unlocking and disconnection are carried out in the following manner.

Exerting a rearwards pulling force on the sleeve 12 causes the latter to move relative to the central body 10, 18 and to the sheath 11 until the arm 120 of the sleeve comes into abutment against the shoulder 101 of the front central body 10.

As long as the pulling force F1 is below the threshold value F2, which is typically equal to 8 N, the flexible arm 120 comes into and remains in abutment against the shoulder 101 of the front body 10, thereby preventing any retraction of the sheath 11 and thus leaving the lugs 100 clip-fastened (FIG. 7). This prevents any unwanted unlocking.

In the event of an intentional pulling action with a pulling force F3 greater than the threshold value F2, the arm 120 is deflected and thereby released from the abutment 101 (FIG. 8), which allows additional retraction of the sheath 11 until the complementary reliefs 131, 231 in the insert are uncovered, thus allowing the contact to be unclipped from the latter. Intentional unlocking is carried out.

The flexible arm 120 according to the invention thus prevents any unwanted unlocking in the event of the sleeve 12 being mistakenly pulled rearwards by an operator or undesirably engaged with whilst the cable is being handled or the like.

Furthermore, in the version that is sealed by means of the gaskets 15 and 16, any unlocking that could occur as a result of reduced pressure external to the sealed region delimited by the gaskets 15 and 16 is prevented. Thus, even in the event of a pressure differential between the inside of this region and the outside, for example in the event of a connection assembly CM, CF being used at altitude, in an aeronautical or space application, which would exert a pulling force below the threshold value F2 on the sleeve 12, the flexible arm 120 comes into and remains in abutment against the shoulder 101 of the front body 10. In other words, the invention also prevents any unwanted unlocking that could be caused by external reduced pressure.

Figure 9:
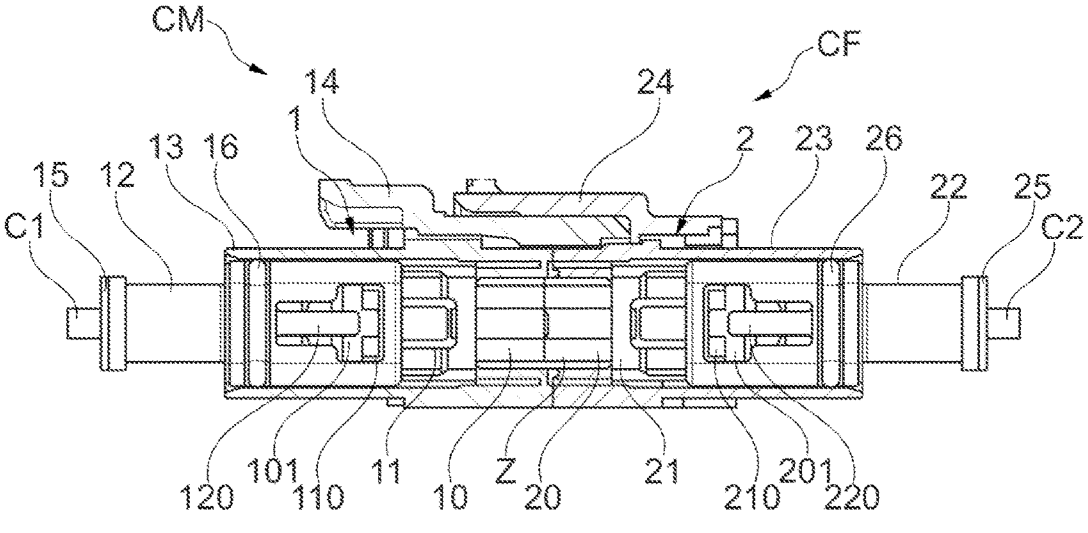
FIG. 9 shows a partial longitudinal cross-sectional view of an optical connection assembly, of MPO contact type, according to the invention in the connected and locked configuration.

FIG. 9 shows a connection assembly with two connectors CM, CF with complementary contacts 1, 2 according to the invention, in the connected and locked configuration, with each contact within its respective insert 13, 23, which is itself mounted in a housing 14, 24.

Figure 10:
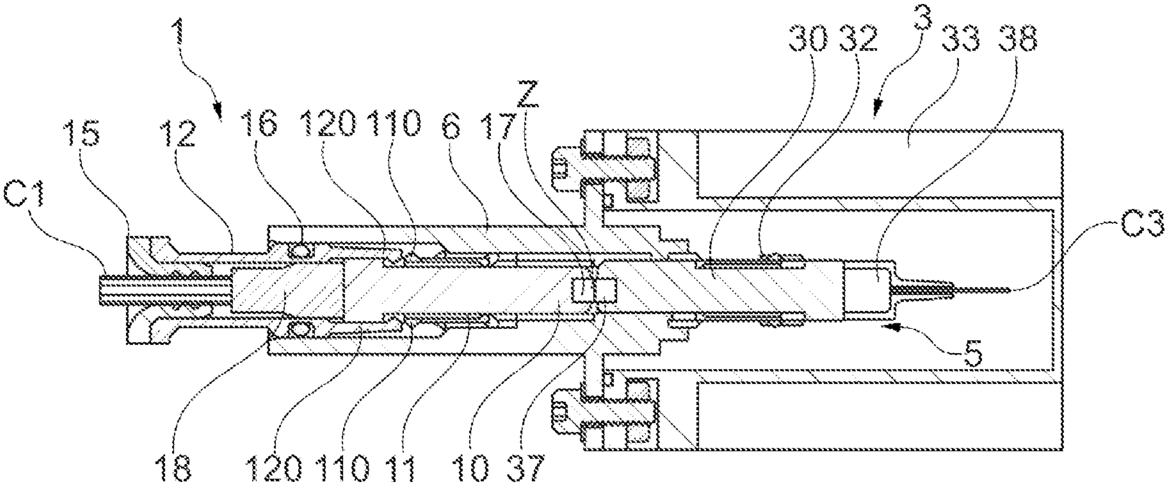
FIG. 10 is a partial longitudinal cross-sectional view of a contact of MPO type according to the invention in a configuration in which it is connected and locked in an adaptor installed on an item of electronic equipment.

FIG. 10 shows another example of a connection between a contact 1, such as the one described with reference to FIGS. 3 and 5, and an MPO contact 5 according to the prior art cabled to an optical cable C3, said contacts being coupled inside an adaptor 6, which is installed on an item of electronic equipment 3.

In this case, the item of electronic equipment 3 comprises an MPO contact 5 according to the prior art with a front central body 30 within which an optical ferrule 37 is housed, said optical ferrule being coupled to the optical ferrule 17 of the contact 1 within the optical coupling region Z.

The MPO contact 5 also comprises a rear central body 38 at the rear of the front body 30 and a sheath 32 situated around the front central body 30.

In this case, the adaptor 6 is screwed in a sealing manner to the housing 33 of the item of electronic equipment 3.

Figure 11:
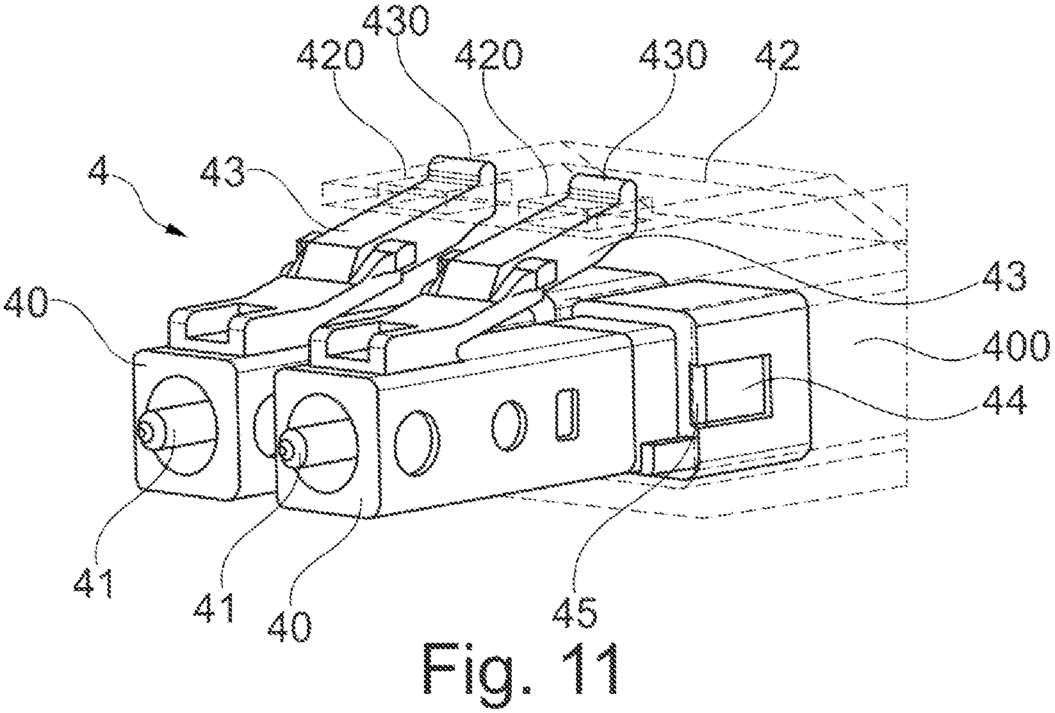
FIG. 11 is a perspective view of an optical contact of duplex LC (lucent connector) type according to the invention in a locking configuration.
Figure 12:
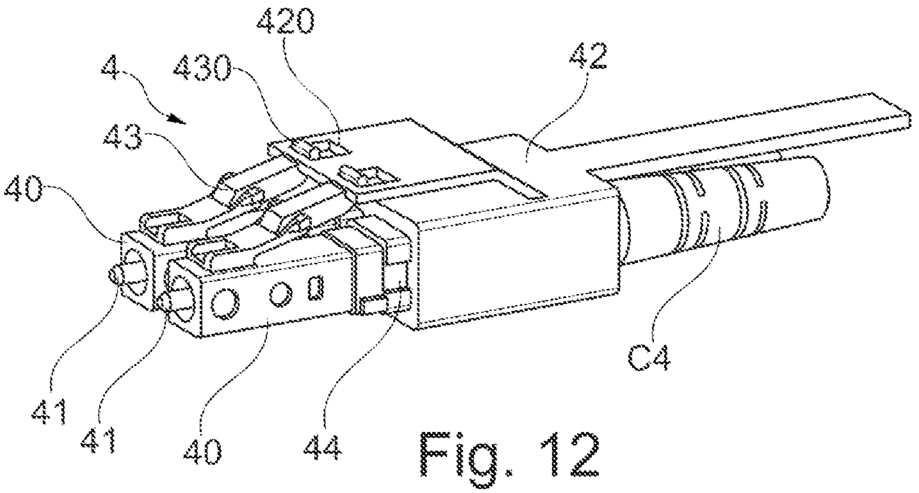
FIG. 12 is another perspective view of the contact according to FIG. 11 in an unlocking configuration, the temporary-retention means being in a released position.
Figure 13:
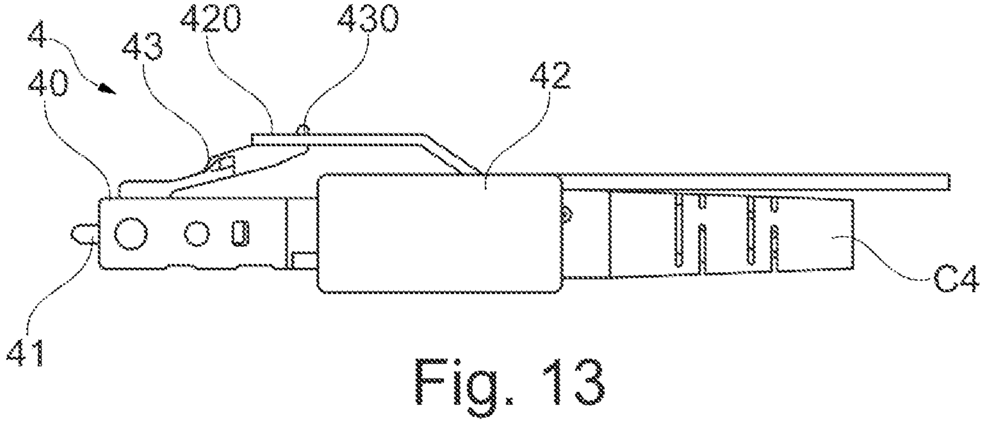
FIG. 13 shows FIG. 11 again in a side view.

FIGS. 11 to 13 relate to a second embodiment of an optical contact of duplex LC type according to the invention.

The optical contact 4 comprises two optical channels, of simplex LC type, which are cabled side by side to an optical cable C4, each of the two optical channels comprising a body 40 in which a ceramic optical ferrule 41 is mounted. The rear portion 400 of the body 40 houses the end of the optical cable C4.

A sleeve 42 directly surrounds the two bodies 40 from the rear as well as the end of the cable C4.

The sleeve 42 comprises two through-apertures 420 within each of which the free end 430 of a locking/unlocking lever 43, which is mounted so as to be able to pivot on one of the bodies 40, is inserted. In the example illustrated, the lever 43 is produced integrally with the body 40 and may be deflected.

According to the invention, at least one of the side edges of the two bodies 40 comprises a recess 44 that forms an abutment for retaining a lug 45 that projects from the inside of the sleeve 42.

Thus, when the connector 4 is in the connected and locked configuration, in the event of a rearwards pulling action below a predetermined threshold value, the lug 45 is retained clip-fastened by the abutment formed by the recess 44. Also, in this case, the free end 430 of each lever 43 remains undeflected within the corresponding aperture 420 in the sleeve 42.

In the event of a pulling action above the predetermined threshold value, the lug 45 is unclipped from the abutment, the rearwards movement of the sleeve 42 subsequently causes the edge of each aperture 420 to be placed in abutment with the free end 430 of the lever 43, until said free end is deflected and thus each contact is unlocked.

The lug 45 and the recess 44 may be positioned at any other location at the periphery of the contact. The lug 45 may also be formed on the body of the LC contact whereas the recess 44 may be formed on the sleeve 42. Alternatively, the lug 45 may be replaced by an elastic clip-fastening tab. More generally, any interference means capable of elastic deformation may be suitable.

Other variants and improvements may be provided without thereby departing from the scope of the invention.

The temporary-retention means illustrated for contacts of MPO type is a flexible arm that is produced integrally on the cable sleeve and that comes into abutment against a shoulder of the central body. Other forms of retention means and fixed retention points that are arranged on a connector component other than the central body, such as the insert or the housing, may be contemplated. The same is true for all of the connectors to which the invention applies.

The invention claimed is:

1. An electrical and/or optical contact, comprising:

at least one central body extending along a longitudinal axis, said at least on central body having:

a front portion designed to house and hold at least one electrically conductive element and/or an optical ferrule intended to be connected to one end of a cable; the front portion having at least one means for locking/unlocking the connection between the contact and a cavity into which it is intended to be inserted;

a rear portion designed to house the end of the cable; and a sleeve designed to house the cable and to move rearwards/forwards with respect to the central body, the sleeve having at least one means for temporarily retaining the sleeve on the central body or on a component of the connector that is fixed with respect to the body, the temporary-retention means being active in the event of a pulling force (F1) below or equal to a predetermined threshold (F2) being exerted on the sleeve, in order to prevent the unlocking means, which disconnects the contact, from being activated.

2. The electrical and/or optical contact according to claim 1, wherein the pulling force (F3) to be exerted on the sleeve in order to activate the unlocking means is greater than the predetermined threshold (F2).

3. The electrical and/or optical contact according to claim 1, wherein the temporary-retention means are arranged such that, when the latter is inactive, the sleeve moves rearwards along a non-zero travel in order to activate the unlocking means.

4. The electrical and/or optical contact t according to claim 1, comprising, as locking/unlocking means:

a peripheral body, referred to as a sheath, which is mounted so as to be able to slide around the central body, one or more clip-fastening lugs on at least one of the side edges of the central body in order to clip-fasten the latter within the cavity, the temporary-retention means being a flexible arm that is fixed to or produced integrally with the sleeve, the flexible arm being designed, in the event of a pulling force (F1) below or equal to the predetermined threshold (F2) being exerted on the sleeve, to come into and be retained in abutment against a shoulder of the central body, and, above this predetermined threshold, to be deflected and released from the abutment, the sleeve being mounted so as to be able to slide rearwards with respect to the central body and to the sheath along a travel beyond the abutment until it engages with one or more reliefs of the sheath and, in the event of a pulling force (F3), moves the sheath rearwards into an unlocking position in which it releases the one or more lugs and allows the latter to be unclipped.

5. The electrical and/or optical contact according to claim 4, comprising two central bodies, one of which forms the front portion within which the optical ferrule is housed and the other of which forms the rear portion that is mounted within the sleeve.

6. The electrical and/or optical contact according to claim 4, comprising at least one return spring mounted between the central body and the sheath and designed to bring the sheath from its unlocking position to its locking position in which it prevents the one or more clip-fastening lugs from being unclipped from the or their cavity.

7. The electrical and/or optical contact according to claim 4, comprising an optical ferrule of MT ferrule type, which contains a plurality of optical channels that are designed to individually house an optical fibre, the optical ferrule being housed within the central body.

8. The electrical and/or optical contact according to claim 1, comprising, as locking/unlocking means, at least one lever mounted so as to be able to pivot on the central body), the temporary-retention means being a lug that is fixed to or produced integrally with the sleeve, the lug being designed, in the event of a pulling force (F1) below or equal to the predetermined threshold (F2) being exerted on the sleeve, to come into and be retained in abutment against a recess in the central body, and, above this predetermined threshold, to be disengaged from the abutment, the sleeve comprising at least one through-aperture within which the lever is housed, the sleeve being mounted so as to be able to slide rearwards with respect to the central body along a travel beyond the abutment until the edge of the aperture causes the lever to pivot, in the event of a pulling force (F3), into an unlocking position in which it unlocks the contact.

9. The electrical and/or optical contact, of an LC type, according to claim 8, comprising an optical ferrule, which contains a central optical channel that is designed to house a single optical fibre, the optical ferrule being housed within the central body.

10. The electrical and/or optical contact according to claim 1, wherein the sleeve is based on polymer material.

11. The electrical and/or optical contact according to claim 1, comprising a gasket arranged at the periphery of the sleeve in order to seal the one or more cavities in which the one or more contacts are intended to be inserted.

12. A connector comprising:

at least one cavity into which the one or more electrical and/or optical contacts according to claim 1 are intended to be inserted.

13. A method of employing one or more of said electrical and/or optical contacts, said method comprising the steps of:

producing an electrical and/or optical connection in the aeronautical field with said connector of claim 12, the predetermined threshold being at least equal to 8 N.

14. An adaptor comprising:

a body defining the one or more cavities into which the one or more electrical and/or optical contacts according to claim 1 are intended to be inserted.

15. A method of employing one or more of said electrical and/or optical contacts, said method comprising the steps of:

producing an electrical and/or optical connection in the aeronautical field with said adaptor of claim 14, the predetermined threshold being at least equal to 8 N.

* * * * *